United States Patent [19]
Seidel

[11] 3,815,040

[45] June 4, 1974

[54] FEED-FORWARD, ERROR-CORRECTING SYSTEMS

[75] Inventor: Harold Seidel, Warren, N.J.

[73] Assignee: Bell Telephone Laboratories, Incorporated, Murray Hill, Berkeley Heights, N.J.

[22] Filed: Mar. 2, 1973

[21] Appl. No.: 337,670

[52] U.S. Cl. .................. 330/149, 330/151, 332/18, 332/37 R

[51] Int. Cl. .................. H03f 1/28

[58] Field of Search .... 330/149, 151; 332/48, 37 R; 325/472, 476; 328/163

[56] References Cited

UNITED STATES PATENTS

| | | | |
|---|---|---|---|
| 2,835,869 | 5/1958 | Morrison | 332/37 R |
| 3,274,492 | 9/1966 | Van Kesser et al. | 332/37 R X |
| 3,348,126 | 10/1967 | Kaufman | 330/149 X |
| 3,365,674 | 1/1968 | Treu | 330/149 |

FOREIGN PATENTS OR APPLICATIONS

| | | | |
|---|---|---|---|
| 802,218 | 10/1958 | Great Britain | 332/18 |

*Primary Examiner*—Herman Karl Saalbach
*Assistant Examiner*—James B. Mullins
*Attorney, Agent, or Firm*—S. Sherman

[57] ABSTRACT

In a feed-forward, error-correcting system in accordance with the present disclosure, the error signal is formed by comparing the modulation component of the signal before and after signal processing. The error signal is then used to modulate the main signal so as to reduce the modulation error components introduced by the signal processing circuits.

10 Claims, 5 Drawing Figures

FEED-FORWARD, ERROR-CORRECTING SYSTEMS

The invention relates to feed-forward, error-correcting systems and, in particular, to feed-forward amplifier circuits.

BACKGROUND OF THE INVENTION

In applicant's U.S. Pat. Nos. 3,471,798; 3,541,467; and 3,649,927, various feed-forward, error-correcting amplifier circuits are disclosed wherein an amplified signal, derived from a main signal amplifier, is compared with a time-delayed reference signal such that error components introduced by the main amplifer, and present in the amplfied signal, are isolated. The error signal thus produced, which includes both noise and distortion components, is then amplified to an appropriate level by means of an auxiliary amplifier, and thereafter subtracted from the amplified signal so as to reduce the net error in the amplifier output signal.

Each of the above-identified prior art amplifiers comprises two bridge circuits. The first circuit isolates the error signal by subtracting the reference signal from a component of the main amplifier output signal. The second bridge circuit subtracts the error signal from the uncorrected main amplifier output signal to form the corrected output signal. Such a system requires that the two signals to be differenced be carefully adjusted in both amplitude and phase since any initial imbalance in either amplitude or phase is improperly treated as an error by the first bridge circuit, and results in an improper correction by the second bridge circuit. This requires careful system adjustment of both parameters and a high degree of long term system stability. In addition, in such a system, the bandwidth of the auxiliary amplifier, (i.e., the error amplifier) must be coextensive with that of the main signal amplifier.

Error-correction of the type described hereinabove is advantageously employed in multichannel communication systems where it is important to minimize intermodulation effects which cause crosstalk among the several channels.

There are, however, other situations in which it is only necessary to correct errors which affect the modulation component of the signal, and it is not necessary to be concerned with instantaneous errors at the carrier frequency. For example, in a phase modulated system wherein only the modulation is of interest, error correction can be limited to only the signal phase, while in an amplitude modulated system phase errors can be ignored, and the correction system adapted to sense only amplitude errors.

It is, therefore, the broad object of the present invention to apply feed-forward, error-correcting techniques with concern only for the information content of the signal, as represented by the modulation impressed upon the higher frequency carrier signal.

SUMMARY OF THE INVENTION

A typical feed-forward, error-correcting system comprises a main signal wavepath wherein the signal process circuit is located, and an auxiliary wavepath wherein the error forming circuits are located.

In a feed-forward, error-correcting system in accordance with the present invention, the error signal is formed from the modulation component of the signal. Accordingly, the error sensing portion of the present invention comprises a pair of modulation detectors, and a differencing circuit. The detectors demodulate a component of the main wavepath signal, and a time-delayed component of the imput signal. The difference circuit compares the two demodulated components, and forms an error signal whose magnitude and polarity are a measure of the magnitude and sense of their difference. The error signal thus formed is amplified, if necessary, and then used to modulate the main wavepath signal so as to generate compensating modulation components that are equal in amplitude but 180 degrees out of phase with the spurious modulation components introduced by the signal processing circuits located in the main wavepath.

Whereas prior art feed-forward systems employed two arithmetic differencing procedures, the feed-forward system disclosed herein employs one arithmetic process to form the error signal, but a multiplicative (i.e., modulation) process to make the error correction.

It is a first advantage of the present invention that the bandwidth of the error amplifier is defined by the modulation bandwidth, rather than by the carrier frequency bandwidth as in the prior art.

It is a second advantage of the invention that the system tolerances can be relaxed in some measure since it is no longer necessary to equalize both the phase and the amplitude of the signals being differenced in the error sensing portion of the system.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
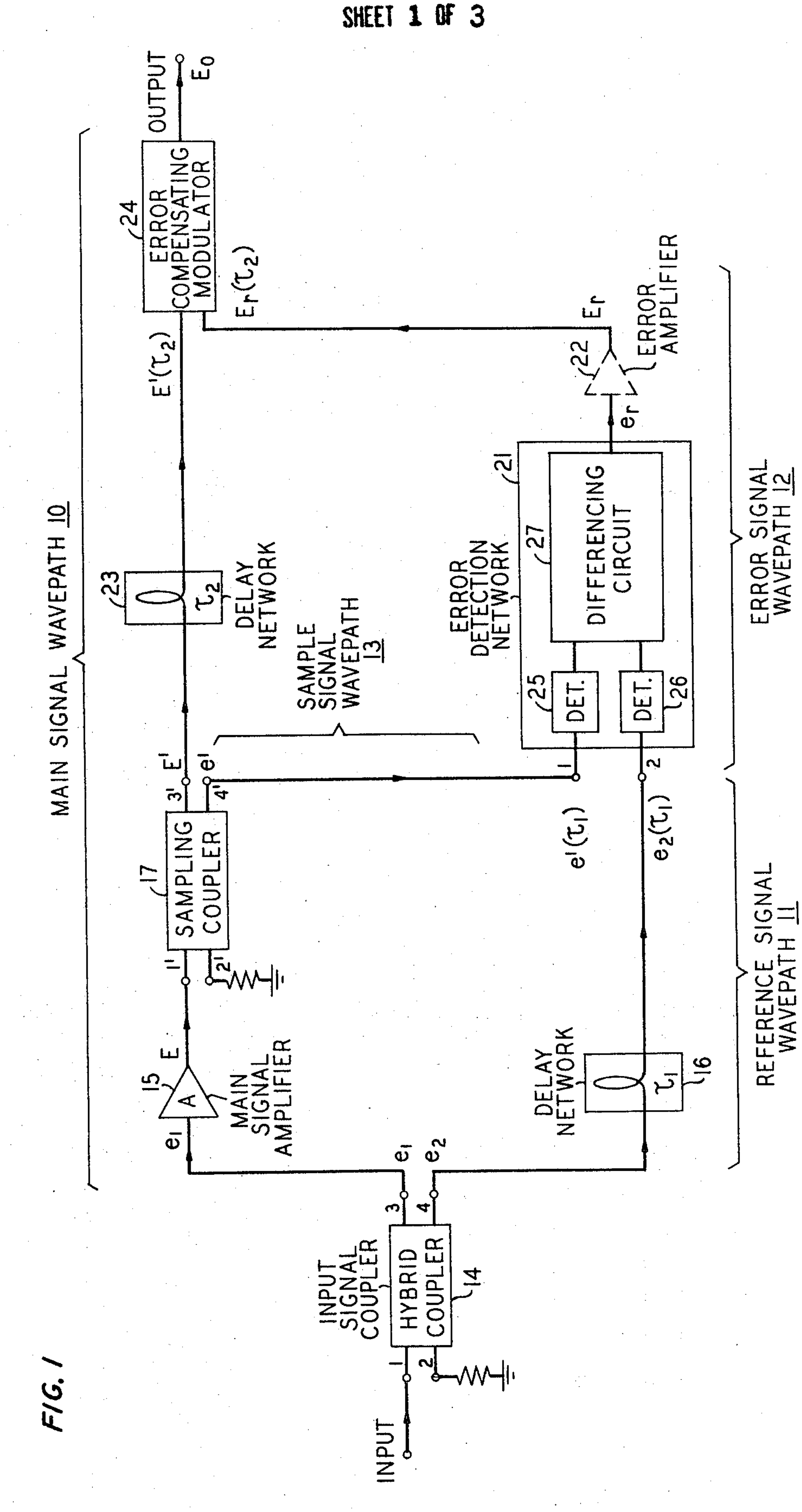
FIG. 1 shows, in block diagram, a feed-forward, error-correction system in accordance with the present invention.

Referring to the drawings, FIG. 1 shows, in block diagram, a feed-forward, error-correcting system in accordance with the present invention. In particular, and for purposes of illustration and explanation, an amplifier is shown. However, as will be indicated hereinbelow, the principles to be disclosed can just as readily be applied to other types of systems such as filters, et cetera.

As illustrated, the amplifier includes a main signal wavepath 10 comprising, in cascade: a main signal amplifier 15; a sampling coupler 17; a delay network 23; and an error compensating modulator 24. An auxiliary wavepath comprises, in cascade, a reference signal wavepath 11 and an error signal wavepath 12. The former includes a time delay network 16. The latter includes an error detection network 21 and, optionally, an error amplifier 22. A third wavepath, identified as sample signal wavepath 13, connects one of the output ports 4' of sampling coupler 17 to one of the two input ports of the error detection network.

In operation, a modulated input signal $e$ is coupled to a port 1 of input signal coupler 14, which divides the signal into two components $e_1$ and $e_2$. One of the components $e_1$, is coupled to the main signal amplifier 15 wherein it is amplified to produce an output signal E. The latter is coupled, in turn, to a port 1' of sampling coupler 17, wherein it is divided into two components E' and e'. The larger of the two components, E', appearing at sampling coupler port 3', is coupled to delay network 23. The smaller of the two components, e', appearing at sampling coupler port 4', is coupled to one of the input ports of error detection network 21.

The other input signal component, $e_2$, is coupled through delay network 16 to a second input port of the error detection network. Designating the total time delay between port 3 of input coupler 14 and the one input port of error detection network 21 as $\tau_1$, the time delay introduced by delay network 16 is such that an equal total time delay $\tau_1$ is produced between port 4 of input coupler 14 and the second input port of error detection network 21. So adjusted, the component $e'$ of the amplified main signal, and the reference signal $e_2$ appear at the input ports of detection network 21 in time coincidence. Accordingly, in FIG. 1 these two signals are designated $e'(\tau_1)$ and $e_2(\tau_1)$.

An error signal is formed in error detection network 21 by demodulating each of the signals $e'$ and $e_2$ applied thereto by means of modulation detectors 25 and 26, respectively, and then subtracting one of the detected signals from the other in a differencing circuit 27. The resulting error signal $e_r$ is amplified, if required, by means of error amplifier 22, shown in dashed line. The amplified error signal E thus produced is then coupled to error compensating modulator 24 along with signal component E'. Designating the total time delay between the input to detection network 21 and the input to modulator 24 as $\tau_2$, the time delay introduced by delay network 23 is adjusted such that the total delay between port 3' of coupler 17 and modulator 24 is also $\tau_2$. Thus, the two signals applied to the error compensating modulator 24 arrive in time coincidence. In addition, the amplitude and the sense of error signal $E_r$ is such as to produce a compensating modulation which reduces the net error in the amplfier output signal $E_0$.

FIG. 1 illustrates the basic components of a feed-forward, error-correcting system in accordance with the present invention. The details of such a system will differ somewhat, depending upon the type of modulation employed. The principle differences will reside in the type of modulation detectors used in the error detection network, and in the type of modulation employed in the error compensating modulator. To illustrate some of these details and differences, illustrative circuits for each of the basic modulation processes, i.e., phase, frequency and amplitude, will now be considered. In each instance, the same identification numerals will be used, as in FIG. 1, to identify corresponding components, and comments will be limited to those portions of the circuit which are different or do not appear in FIG. 1.

Phase Modulation

Figures 2, 3, 4:
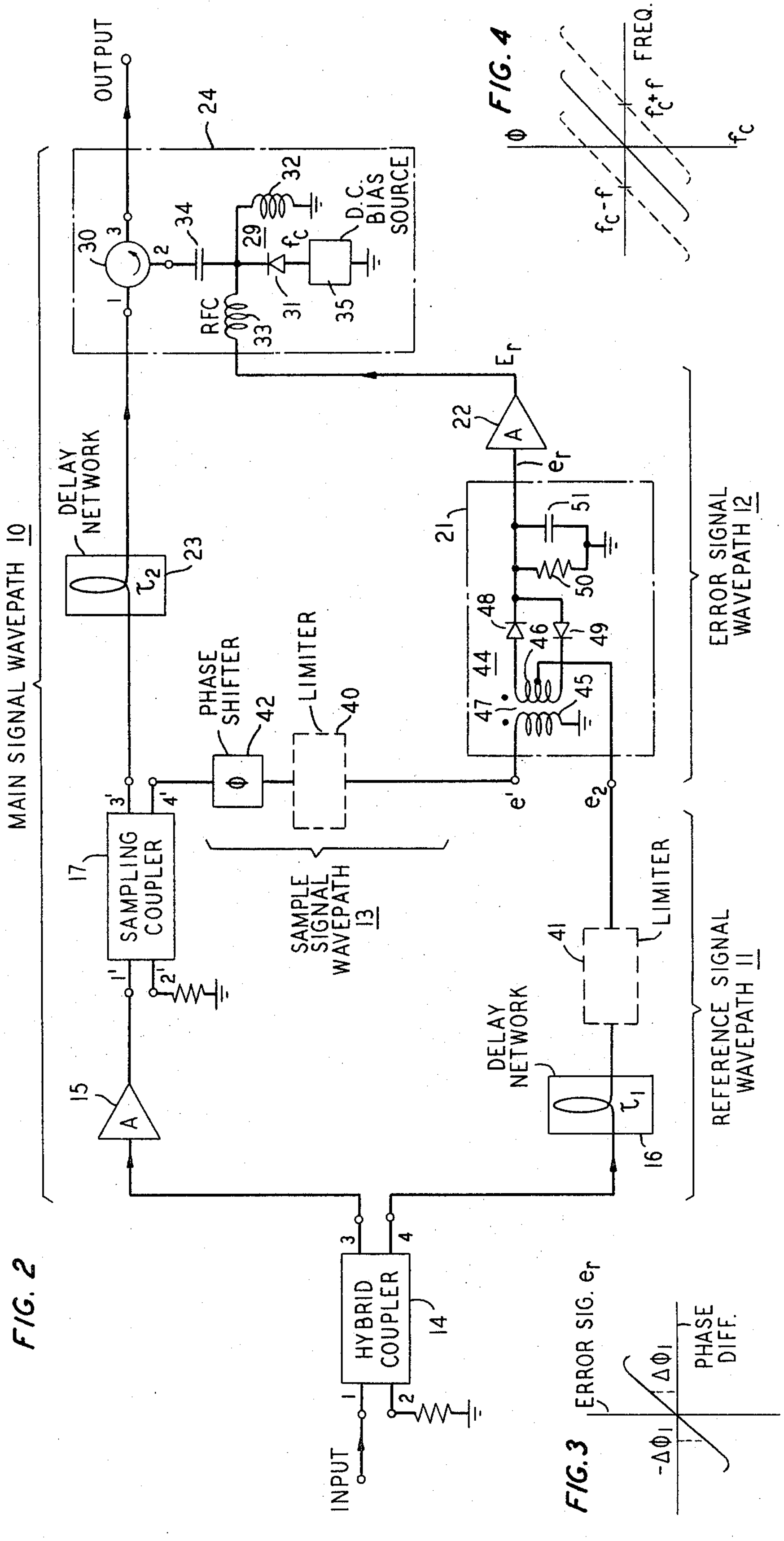
FIG. 2 shows the feed-forward system of FIG. 1 adapted for use as a phase error-correcting amplifier or a frequency error-correcting amplifier.
FIG. 3 and 4, included for purposes of explanation, show, respectively, the input-output characteristic of the error detection network, and the frequency-phase characteristic of the phase shifter in the error compensating modulator.

FIG. 2, now to be considered, illustrates a feed-forward, phase error-correcting amplifier for use with phase modulated signals. In particular, in such a system the error detection network 21 comprises a synchronous detector 44 which compares the phase of the amplified signal component $e'$ relative to that of the reference signal $e_2$. Specifically, one of the signals $e'$ is coupled across a winding 45 of a two winding transformer 47. The other signal $e_2$ is connected to the center-tap of the other transformer winding 46. The sum of the two applied signals is formed at one end of winding 46 and the difference of the two signals is formed at the other end of the winding. The sum and difference signals are then amplitude-detected by means of oppositely poled diodes 48 and 49, and the two detected signals differenced in resistor 50. Capacitor 51 serves as a high frequency by-pass capacitor.

A typical input-output curve for phase detector 44 is shown in FIG. 3, which is a plot of the output error signal $e_r$ as a function of phase difference $\Delta\phi$. Such curves included a linear region about the origin. The actual operating range, $\pm\Delta\phi_1$, which encompasses the entire range of anticipated spurious phase variations introduced by amplifier 15, is relatively small compared to the overall linear portion of the curve and, hence, readily falls within the linear portion of the curve. Advantageously, a phase shifter is included in either the signal sample wavepath 13, as shown, or in the reference path 11, and is adjusted so that with zero phase error, the error signal is also zero. This adjustment centers the operating range $\pm\Delta\phi_1$ about the origin, as shown in FIG. 3. In addition, by centering the operating range about the origin, the absolute phase of the signal is preserved. This is often of importance in a phase modulated system.

Since only phase errors are being corrected, the two signals $e'$ and $e_2$ need not be equal in magnitude. However, inasmuch as the error signal will vary with changes in the amplitude of either $e'$ or $e_2$, limiters 40 and 41 can be included in the sample signal wavepath 13 and in the reference wavepath 11 if required.

The error signal is amplified in error amplifier 22, and the amplified error signal coupled to modulator 24 which, in the instant case, is a variable phase shifter. The latter, for purposes of illustration, includes a three-port circulator 30 and a parallel resonant circuit 29 comprising a varactor diode 31 and an inductor 32. In particular, the main signal path 10 is connected to circulator port 1. Circulator port 2 is connected through a d.c. blocking capacitor 34 to resonant circuit 29, while circulator port 3 is the modulator output port.

The error signal is coupled to varactor 31 through a radio frequency choke (RFC) 33 and serves to vary the resonant frequency of the tuned circuit by varying the voltage across the varactor diode. Initially, the resonant frequency is established by adjusting the d.c. bias applied to varactor 31. The bias, derived from a d.c. bias source 35 connected in series with the varactor, is selected so as to accommodate the full range of anticipated error signal variations. The resulting frequency-phase characteristic of the tuned circuit for zero error signal is shown in solid line in FIG. 4. This curve is linear over a frequency range $\pm f$ above and below the resonant frequency $f_r$. The application of an error signal detunes the resonant circuit and shifts the phase curve to the right or left, depending upon the polarity of the error signal, as indicated by the dashed curves. The result of this shift is to increase or decrease the total phase shift experienced by the signal as it passes through the phase shifter. The sense of this phase shift is such as to reduce any phase error introduced by amplifier 15.

It should be noted that the particular synchronous phase detector shown in FIG. 2 is merely illustrative of such detectors. More generally, any one of the many well known balanced modulators can be used for this purpose. Similarly, other types of variable phase shifters can be used as error compensating modulators in accordance with the present invention.

Frequency Modulation

Recognizing that frequency is merely the rate at which phase varies, the phase error-corrected amplfier shown in FIG. 2 can also be used as a feed-forward, frequency error-correcting amplfier. However, inasmuch as the absolute phase of a frequency modulated signal is, typically, not significant, it is not as important to center the operating range of the error detector about the origin as described hereinabove.

Amplitude Modulation

Figure 5:
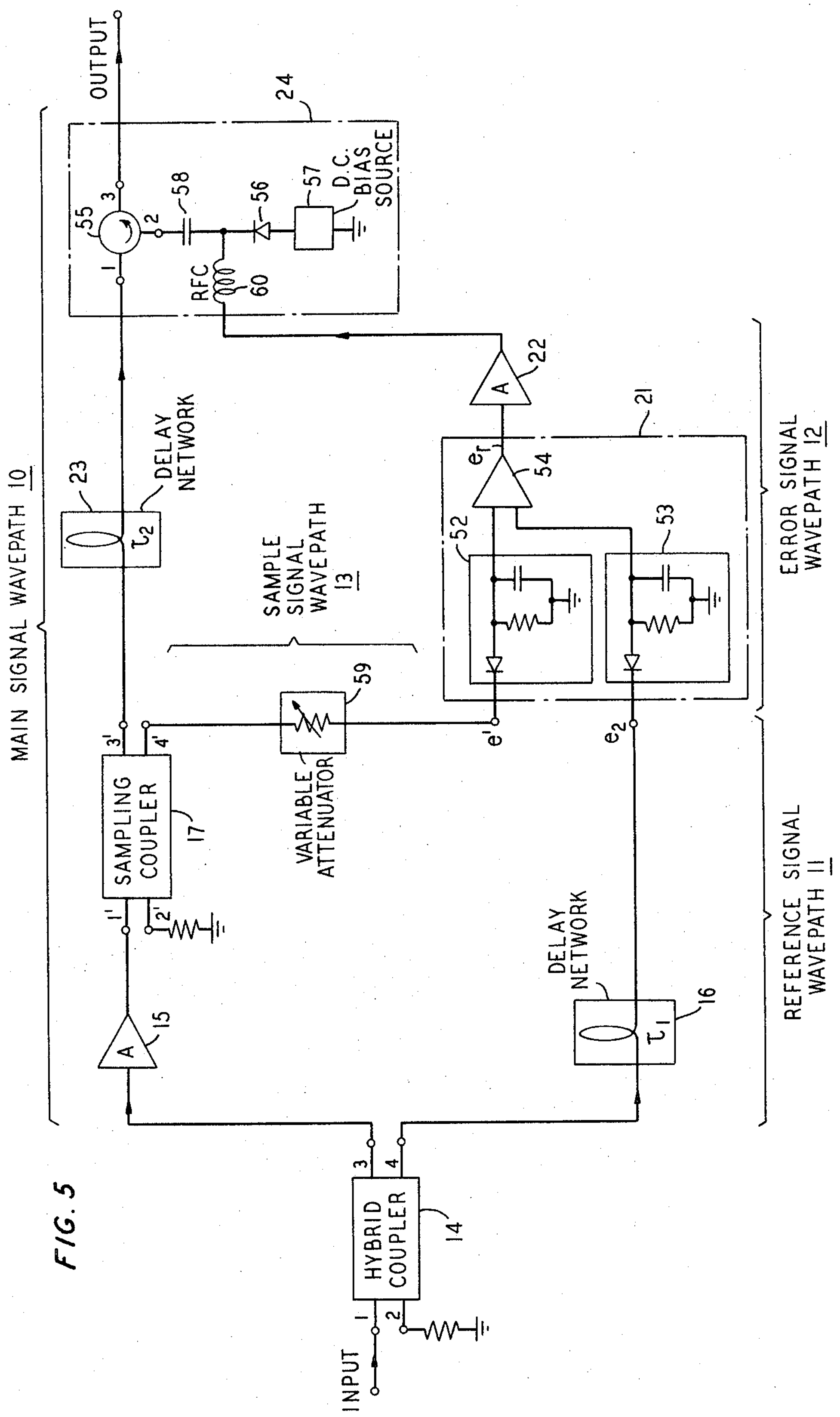
FIG. 5 shows a feed-forward, amplitude error-correcting amplifier.

In a feed-forward, amplitude error-correcting amplifier, as illustrated in FIG. 5, the error detection network 21 includes two amplitude detectors 52 and 53, and a differential amplifier 54. Since this system detects changes in the relative amplitudes of the different frequency components present in the amplified signal, the power division ratios of couplers 14 and 17 are proportioned so that under conditions of no error, the magnitudes of the two signals $e'$ *and* $e_2$ coupled to the input ports of detectors 52 and 53 are such as to produce zero error signal $e_r$ at the output of differential amplifier 54. To this end, an attenuator 59 is advantageously included in sample signal wavepath 13. Since the relative phase of the two signals is not significant, no phase controls need be provided.

The error signal produced at the output of detection network 21 is amplified in amplifier 22 and then coupled to error compensating modulator 24. The latter is a variable attenuator which amplitude modulates the main signal. For purposes of illustration, modulator 24 comprises a three-port circulator 55 and a PIN diode 56 whose resistive impedance is varied by the applied error signal. In particular, the main signal path 10 is connected to circulator port 1. Circulator port 2 is connected through a d.c. blocking capacitor 58 to diode 56. Circulator port 3 is the modulator output port.

The error signal is coupled to diode 56 through a radio frequency choke (RFC) 60 and serves to vary the diode resistance by changing the bias across the diode. Initially, the bias is established by the d.c. bias source 57 connected in series with diode 56. The sense of the applied error signal is such as to reduce any spurious changes in signal amplitude produced by the main signal amplifier.

While the several illustrative embodiments have been referred to as amplifiers, the feed-forward systems described hereinabove have broader applications. For example, amplifier 15 can, more generally, be any signal processing circuit such as, for example, a filter whose phase characteristic is a nonlinear function of frequency, or whose amplitude characteristic is not flat over the frequency band of interest. In either case, feed-forward techniques can be employed to compensate for either of these deficiencies.

It will also be recognized that the particular modulation detectors, and compensating modulators disclosed are merely intended to be illustrative of the class of devices that can be used for the purposes described. Thus, in all cases it is understood that the above-described arrangements are illustrated of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A feed-forward, error-correcting system comprising:

means for dividing the input signal to said system into two signal components;

means for coupling one of said signal components to a signal processing circuit;

means for comparing the modulation components of the output signal from said signal processing circuit and the modulation components of said other input signal component, and for forming an error signal corresponding to the spurious modulation components introduced by said signal processing circuit;

modulation means, responsive to said error signal, for generating in the output signal from said signal processing circuit modulation components equal in amplitude but 180° out of phase with the spurious modulation components introduced by said processing circuit;

means for coupling said error signal and the output signal from said processing circuit to said modulation means;

and means for extracting a corrected output signal from said modulation means.

2. The system acccording to claim 1 wherein said signal processing circuit is an amplifier.

3. The system according to claim 1 wherein said input signal is amplitude modulated.

4. The system according to claim 1 wherein said input signal is phase modulated.

5. The system according to claim 1 wherein said input signal is frequency modulated.

6. A feed-forward, phase error-correcting amplifier comprising:

means for dividing the input signal to said amplifier into a main signal component and a reference signal component;

means for amplifying said main signal component;

means including a synchronous phase detector, for comparing in time coincidence the phase of a portion of the output signal from said amplifying means and the phase of said reference signal component, and for forming an error signal proportional to the difference in said phases;

and means for phase modulating the output signal from said amplifying means with said error signal in a sense to reduce the phase error introduced by said amplifying means.

7. The amplifier in accordance with claim 6 including a time delay network for delaying said reference signal an amount of time such that said reference signal and said portion of output signal arrive at said phase detector in time coincidence.

8. The amplifier in accordance with claim 6 including amplitude limiters for maintaining said reference signal and said portion of output signal at constant amplitudes.

9. The amplifier according to claim 6 including a phase shifter for establishing zero error signal under conditions of no phase error.

10. A feed-forward, amplitude error-correcting system comprising:

means for dividing the input signal to said amplifier into a main signal component and a reference signal component;

means for amplifying said main signal component;

means for dividing the output signal from said amplifying means into two unequal signal portions;

first means for amplitude detecting the smaller of said signal portions;

second means for amplitude detecting said reference signal;

means for differencing the output signals from said two detecting means and forming an error signal proportional to their difference;

and means for amplitude modulating the larger signal portion with said error signal in a sense to reduce the amplitude error introduced by said amplifying means.

* * * * *